United States Patent
Lindner et al.

(10) Patent No.: US 12,161,112 B2
(45) Date of Patent: Dec. 10, 2024

(54) SPRAY DRIFT REDUCTION

(71) Applicant: Croda, Inc., Plainsboro, NJ (US)

(72) Inventors: Gregory James Lindner, Wilmington, DE (US); Kevin Wade Penfield, Wilmington, DE (US)

(73) Assignee: Croda, Inc., Plainsboro, NJ (US)

( * ) Notice: Subject to any disclaimer, the term of this patent is extended or adjusted under 35 U.S.C. 154(b) by 414 days.

(21) Appl. No.: 17/152,094

(22) Filed: Jan. 19, 2021

(65) Prior Publication Data

US 2021/0204541 A1  Jul. 8, 2021

Related U.S. Application Data

(63) Continuation of application No. 14/910,846, filed as application No. PCT/US2014/048609 on Jul. 29, 2014, now abandoned.

(60) Provisional application No. 61/865,753, filed on Aug. 14, 2013.

(51) Int. Cl.
*A01N 25/24* (2006.01)
*A01N 25/30* (2006.01)
*A01N 57/20* (2006.01)

(52) U.S. Cl.
CPC .............. *A01N 25/24* (2013.01); *A01N 25/30* (2013.01); *A01N 57/20* (2013.01)

(58) Field of Classification Search
CPC ......... A01N 25/24; A01N 25/30; A01N 57/20
See application file for complete search history.

(56) References Cited

U.S. PATENT DOCUMENTS

| | | | |
|---|---|---|---|
| 4,681,617 A | 7/1987 | Ghyczy et al. | |
| 5,583,089 A | 12/1996 | Winston | |
| 5,631,205 A | 5/1997 | Killick et al. | |
| 5,874,096 A | 2/1999 | Hazen | |
| 6,214,771 B1 | 4/2001 | Dexter | |
| 6,451,339 B2 | 9/2002 | Patel et al. | |
| 6,451,731 B1 | 9/2002 | Agbaje et al. | |
| 8,076,268 B2 | 12/2011 | Schnabel et al. | |
| 2002/0009437 A1 | 1/2002 | Hiromoto | |
| 2002/0161057 A1* | 10/2002 | Fefer ................ | A01N 25/30 516/98 |
| 2007/0298970 A1 | 12/2007 | Mann et al. | |
| 2008/0194704 A1 | 8/2008 | Bhatnagar et al. | |
| 2009/0061028 A1 | 3/2009 | Arimoto | |
| 2009/0098274 A1 | 4/2009 | Kodama et al. | |
| 2010/0113275 A1 | 5/2010 | Qin et al. | |
| 2011/0111961 A1 | 5/2011 | Sun | |
| 2013/0053349 A1 | 2/2013 | Mainx et al. | |
| 2013/0150241 A1 | 6/2013 | Elsik | |
| 2014/0031467 A1* | 1/2014 | Brown ................ | A01N 57/20 524/188 |
| 2014/0113827 A1 | 4/2014 | Goyal et al. | |

FOREIGN PATENT DOCUMENTS

| | | |
|---|---|---|
| EA | 015674 B1 | 10/2011 |
| EP | 0539980 A1 | 5/1993 |
| EP | 862861 A1 | 9/1998 |
| EP | 1787514 A1 | 5/2007 |
| EP | 2737799 A1 | 6/2014 |
| JP | 11029413 A | 2/1999 |
| RU | 2380904 C2 | 2/2010 |
| WO | 9400508 A1 | 1/1994 |
| WO | WO 9508916 * | 4/1995 |
| WO | 9616930 A1 | 6/1996 |
| WO | 0174161 A2 | 10/2001 |
| WO | 2004080177 A3 | 9/2004 |
| WO | 2005041661 A1 | 5/2005 |
| WO | 2006053048 A2 | 5/2006 |
| WO | 2007135384 A2 | 11/2007 |
| WO | 2008127661 A1 | 10/2008 |
| WO | 2010003889 A1 | 1/2010 |
| WO | 2010049070 A2 | 5/2010 |
| WO | 2012145177 A1 | 10/2012 |
| WO | 2013040006 A1 | 3/2013 |
| WO | 2014025413 A1 | 2/2014 |
| WO | 2014066466 A1 | 5/2014 |

OTHER PUBLICATIONS

C. Bogran et al., "Using Oils as Pesticides," Texas A&M AgriLife Extension, published Nov. 2006, p. 1-4.*
Material Safety Data Sheet, "Spray Oil 10," Petro-Canada, Issued: Jul. 25, 2011, p. 1-6.*
Australian Examination Report for Australian Application No. 2014306973, dated Mar. 6, 2017, 5 pages.
Bogran, C., "Using Oils as Pesticides," Texas A&M AgriLife Extension, published Nov. 2006, pp. 1-4.
Corrected Notice of Allowance for U.S. Appl. No. 14/910,830, mailed Sep. 23, 2020, 12 pages.
European Communication for European Application No. 14 750 909.5, dated Jul. 11, 2018, 2 pages.
Final Office Action for U.S. Appl. No. 14/910,830, dated Nov. 26, 2018, 21 pages.

(Continued)

*Primary Examiner* — Mina Haghighatian
(74) *Attorney, Agent, or Firm* — Buchanan Ingersoll & Rooney PC

(57) ABSTRACT

Spray drift reductants for agrochemical formulations and methods for reducing spray drift in agrochemical formulations are disclosed. An agrochemical formulation may comprise at least one spray drift reductant comprising a fatty acid ester of a $C_3$ to $C_8$ polyol, or an oligomer thereof having from 2 to 5 repeat units. The formulation also comprises at least one agrochemical active and/or nutrient, and optionally, a clathrate compound. A sprayable agrochemical formulation may comprise 0.01 wt. % to 1.0 wt. % of a spray drift reductant that is non-ionic, non-self-emulsifiable, has a hydrophilic-lipophilic balance of less than 7, and is capable of reducing spray drift by at least 10%, and also comprises at least on agrochemical active and/or nutrient, and optionally, a clathrate compound.

14 Claims, No Drawings

(56) References Cited

OTHER PUBLICATIONS

Final Office Action for U.S. Appl. No. 14/910,830, dated Apr. 7, 2020, 19 pages.
Godoy et al., "Diagrammatic Scale for Assessment of Soybean Rust Severity", Fitopatol. Bras, vol. 31, No. 1, 2006, pp. 63-68.
International Preliminary Report on Patentability for International Application No. PCT/US2014/048609, dated Feb. 16, 2016, 9 pages.
International Preliminary Report on Patentability for International Application No. PCT/US2014/048813, dated Feb. 16, 2016, 7 pages.
International Search Report and Written Opinion for International Application No. PCT/US2014/048813, dated Oct. 2, 2014, 10 pages.
International Search Report and Written Opinion for International Application No. PCT/US2014/048609, dated Oct. 9, 2014, 12 pages.
Martinez et al., "Synthesis of Biosurfactants: enzymatic esterification of diglycerol and oleic acid. 1. Kinetic Modeling", Industrial & Engineering Chemistry Research, vol. 50, pp. 6609-6614 (2011).
Material Safety Data Sheet, "Spray Oil 10", Petro-Canada, Issued: Jul. 25, 2011, pp. 1-6.
Non Final Office Action for U.S. Appl. No. 14/910,830, dated Mar. 8, 2018, 12 pages.
Non Final Office Action for U.S. Appl. No. 14/910,830, dated Sep. 5, 2019, 20 pages.
Russian Search Report for Russian Application No. 2016108712, dated Apr. 11, 2017, 3 pages.
Russian Office Action for Russian Application No. 2016108721/13 (013682), dated Apr. 21, 2017, including English translation, 9 pages.
Tadros, "Emulsion Formation and Stability", Wiley-VCH Verlag Gmbh & Co., 2013, pp. 26-29.
Entire patent prosecution history of U.S. Appl. No. 14/910,846, filed Feb. 8, 2016, entitled, "Spray Drift Reduction."

* cited by examiner

SPRAY DRIFT REDUCTION

CROSS REFERENCE TO RELATED APPLICATIONS

This is a continuation application of application Ser. No. 14/910,846, filed Feb. 8, 2016, which is the U.S. National Phase application of PCT International Application No. PCT/US2014/048609, filed Jul. 29, 2014, and claims priority of U.S. Provisional Application No. 61/865,753, the disclosures of which are incorporated herein by reference in their entireties for all purposes.

The present invention relates to spray drift reductants for agrochemical formulations, particularly for use in spray drift reduction, and more especially for use as spray drift reductants and a method of reducing spray drift in agrochemical formulations comprising said compounds with one or more agrochemical actives and/or nutrients.

Many agricultural pesticides, including insecticides, fungicides, herbicides, miticides, and plant growth regulators, are applied in the form of a liquid composition. In addition to the pesticide, such liquid compositions typically include one or more compounds intended to improve one or more properties of the liquid composition, such as for example, storage stability, ease of handling, and/or pesticide efficacy against target organisms.

The field of agricultural spray drift has been active for several decades with significant findings published on the importance of agriculture spray mixture composition and properties on the potential for small droplet formation and the impact of this effect on drift potential. In the overwhelming majority of circumstances for the citations reviewed herein relating to ground level boom sprayer applications, although the inability to identify or describe a single predictive model using the spectrum of properties measured for the spray mixture was reported, there was significant agreement across researchers throughout the past 20 years that the effectiveness of any drift reduction technology (DRT) is a function not only of the spray system design and operating parameters, but that each selection of design and engineering parameters (nozzle type, fluid pressure, flow rate or orifice size, and spray angle) is influenced, in many cases differently, by the composition and properties of the spray mixture applied.

As has been captured by the summarised research in great detail, each spray mixture evaluated is different and is composed of a formulated pesticide active ingredient and more frequently several actives appearing in different formulations. Each pesticide formulation would be expected to exert an independent effect on droplet size and spray quality when applied separately since they contain independent arrays of formulants, many of which are surface active or contribute to the concentration of dispersed phases in the spray mixture. The research is clear in the importance of each of these materials to the final properties of the mixture and also to the droplet size distribution and spray quality produced by the mixture when applied through a series of nozzles and under differing spray conditions.

When these formulations are combined into a single application, it is reasonable to conclude that the number of component interactions will increase and that the types and strength of these interactions will change based on changes in relative dilution rates and the components and concentrations appearing in the final spray mixture. Added to this will be the influence exerted by other spray modifiers or adjuvants which are also contributing components and effects that are a function of their independently selected formulants where each of which has a differing effect on droplet size and spray quality. Frequently, the component and effect contributions from the adjuvants used can dominate spray properties, notably when the adjuvant is selected for materials and compositions known to strongly influence the droplet size distribution and spray quality of a mixture. To illustrate how sophisticated this research understanding has become, detailed descriptions of these spray component influences appeared over a decade ago to the point of describing differences in effect on critical droplet size criteria observed within a continuous series of analogous surfactant materials.

In light of this clearly demonstrated fact, the performance of a nozzle alone as the sole technology applied in the stated capacity to reduce pesticide drift (one either already certified or in pursuit of certification as a Drift Reduction Technology) cannot be certified for application using data developed with water as the spray mixture. This practice is now well recognized to be misplaced and has been inappropriately oversimplified, especially when (1) a solution pesticide containing significant amounts of surfactant adjuvant is present and (2) other materials purposefully added to modify spray droplet size, pattern, or quality have been added.

The research cited clearly describes the capacity of a technology applied to reduce pesticide drift to be more accurately defined using a combination of the contribution from spray system design and operating parameters with the contribution from an appropriately representative admixture of diluted materials in the model spray mixtures. This mixture should in all cases include a suitable pesticide or pesticides along with a representative adjuvant system. The parties assessing the US EPA Drift Reduction Technology certification testing protocol need to consider and include this relevant research in the final adopted methodology.

There has been an interest in reducing drift of spray applied pesticides and the addition of high molecular weight water soluble polymers to spray compositions as a tank mix to increase droplet size and thereby reduce drift of pesticides in known, see, for example, U.S. Pat. Nos. 5,874,096 and 6,214,771. Such polymeric drift control additives tend to perform best within a relatively narrow range of concentration, for example, in spray compositions comprising from about 0.05 to 0.15 wt. % of such polymer. More recently other approaches, such as the use of certain "self-emulsifiable" esters as drift control agents, see US 2010/0113275, have been described.

There is a continuing interest in developing compounds for controlling drift of spray applied pesticides that exhibit high performance when present in a spray composition in low amount and that are relatively insensitive to the amount of adjuvant in the spray composition.

The agricultural non-ionic (NIC) adjuvant market in North America is typically dominated by nonylphenol ethoxylates with sales of around 10,000 tonnes per year.

Additional benefits suitable for adding value include improvements in limiting or reducing the formation of driftable fine droplets under select spray conditions.

The traditional approach for agrochemical formulations is addition of oils or polymers. However, these components are known to cause increases in droplet fines when the formulation is sprayed, and this is undesirable.

The present invention seeks to provide the use of compounds in agrochemical compositions in combination with one or more agrochemical active and/or nutrient, where the compounds may provide comparable (i.e. by not degrading the spray pattern) or improved properties with regard to spray drift compared to formulations used without spray drift reductants, or in comparison to existing spray drift reductants.

The present invention also seeks to provide the use of agrochemical concentrates and dilute formulations comprising said spray drift reductants. Additionally, the present invention seeks to provide a method of reducing spray drift, and a method of treating vegetation for pests or to provide nutrients.

According to a first aspect of the present invention there is provided a sprayable agrochemical formulation comprising;

i) at least one spray drift reductant comprising a fatty ester of a $C_3$ to $C_8$ polyol, or an oligomer thereof having from 2 to 5 repeat units;
ii) at least one agrochemical active and/or nutrient; and
iii) optionally a clathrate compound.

According to a second aspect of the present invention there is provided a concentrate formulation suitable for making a sprayable agrochemical formulation of the first aspect, said concentrate comprising a spray drift reductant of a fatty ester of a $C_3$ to $C_8$ polyol, or an oligomer thereof having from 2 to 5 repeat units.

According to a third aspect of the present invention there is provided a sprayable agrochemical formulation comprising;

i) in the range of from 0.01 wt. % to 1.0 wt. % spray drift reductant, wherein the reductant is non-ionic, non-self-emulsifiable, has a hydrophilic-lipophilic balance (HLB), as calculated by Griffin's method, of less than 7, and is capable of reducing spray drift by at least 10%; and
ii) at least one agrochemical active and/or nutrient; and
iii) optionally a clathrate compound.

According to a fourth aspect of the present invention there is provided the use of a fatty ester of a $C_3$ to $C_8$ polyol, or an oligomer thereof having from 2 to 5 repeat units, as spray drift reductant in an agrochemical formulation comprising at least one agrochemical active and/or nutrient, and optionally a clathrate compound.

According to an fifth aspect of the present invention there is provided a method of reducing spray drift by using an agrochemical formulation of the first or third aspects, and/or a diluted concentrate formulation of the second aspect.

According to a sixth aspect of the present invention there is provided a method of treating vegetation to control pests and/or to provide nutrients, the method comprising applying a formulation of the first or third aspects, and/or a diluted concentrate formulation of the second aspect, either to said vegetation or to the immediate environment of said vegetation.

It has been found that fatty ester of a $C_3$ to $C_8$ polyol or polyol oligomer comprising agrochemical formulations, and in particular use of these compounds, provides for comparable (i.e. by not degrading the spray pattern), or improved drift control during spraying of said formulation. In particular, use of the fatty ester of a $C_3$ to $C_8$ polyol or oligomer provides for better spray patterns and gives fewer driftable particles.

As used herein, the terms 'for example,' for 'instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that, when describing the number of carbon atoms in a substituent group (e.g. '$C_1$ to $C_6$ alkyl'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

As used herein, the term 'drift' refers to off-target movement of droplets of an agrochemical composition that is applied to a target pest or environment for the pest or to provide nutrients. Spray applied compositions typically exhibit decreasing tendency to drift with decreasing relative amount, typically expressed as a volume percentage of total spray applied droplet volume, of small size spray droplets, that is, spray droplets having a droplet size below a given value, typically a droplet size of less than 150 micrometers. Spray drift of pesticides in particular can have undesirable consequences such as, for example, unintended contact of phytotoxic pesticides with non-pest pest plants like crops or ornamental plants along with damage to such non-pest plants.

As used herein, the term 'spray drift reductant' refers to compounds which when added to a sprayable agrochemical formulation may provide a reduction in observed spray drift when compared to the formulation not comprising said agent.

The fatty ester of a $C_3$ to $C_8$ polyol, or oligomer thereof, may have a general structure (I):

$$P\cdot[R^1]_m \quad (I)$$

wherein:

P is the residue of a $C_3$ to $C_8$ polyol, or residue of an oligomer thereof having from 2 to 5 repeat units, each said polyol having m active hydrogen atoms, where m is an integer in the range from 2 to 7;

each $R^1$ independently represents hydrogen, a $C_1$ to $C_{28}$ hydrocarbyl, or an alkanoyl group represented by —C(O)$R^2$ wherein $R^2$ represents a $C_8$ to $C_{28}$ hydrocarbyl; and wherein at least one $R^1$ group is or comprises an alkanoyl group represented by —C(O)$R^a$.

The fatty ester of a $C_3$ to $C_8$ polyol, or oligomer thereof having from 2 to 5 repeat units, is preferably non-ionic.

The term polyol is well known in the art, and refers to an alcohol comprising more than one hydroxyl group. The term 'active hydrogen' refers to the hydrogen atoms present as part of the hydroxyl groups of the $C_3$ to $C_8$ polyol P. Therefore, it will be understood that the integer m, being the number of active hydrogens in said $C_3$ to $C_8$ polyol, is equivalent to the number of hydroxyl groups present for each $C_3$ to $C_8$ polyol.

The term 'polyol residue' as used herein, unless otherwise defined, refers to an organic radical derived from polyol by removal of m active hydrogen atoms, each hydrogen atom being from one of the hydroxyl groups present.

The polyol residue is a $C_3$ to $C_8$ polyol residue, i.e. formed from a $C_3$ to $C_8$ polyol. More preferably, a $C_3$ to $C_7$ polyol residue, particularly $C_3$ to $C_6$ polyol residues.

The polyol residue may also be a residue of an oligomer of a $C_3$ to $C_8$ polyol, said oligomer having from 2 to 5 repeat units of the monomer polyol. Preferably, said oligomers have from 2 to 4 repeat units. More preferably, from 2 to 3 repeat units.

Where the polyol is a residue of an oligomer of a $C_3$ to $C_8$ polyol, the oligomer may be a homogeneous oligomer formed from identical monomer polyol units, or may be heterogeneous being formed from a number of different $C_3$ to $C_8$ polyol monomer units.

Particularly suitable polyol oligomers may be selected from diglycerol, triglycerol, tetraglycerol, dierythritol, trierythritol, tetraerythritol, di-1,3-propanediol, tri-1,3-propanediol, di(trimethylolpropane), or tri(trimethylolpropane). Preferably, said oligomer is selected from diglycerol, triglycerol, tetraglycerol, di(trimethylolpropane), or tri(trimethylolpropane). More preferably, said oligomer is selected from diglycerol, triglycerol, di(trimethylolpropane), or tri (trimethylolpropane). Most preferably, said oligomer may be diglycerol or di(trimethylolpropane).

It will be understood that features detailed with regard to polyols, such as the values of m and groups R', will apply to the oligomeric polyols and be multiplied up by the relevant number of repeat units of said oligomer, whilst accounting for moles of removed water or ether bridges.

The polyol may be linear, branched, partially cyclic, or cyclic.

The index m is a measure of the alcohol functionality of the polyol, and the fatty ester —C(O)$R^2$ will replace some or all of the active hydrogen atoms (dependent on the reaction conditions). It is possible that esterification at a particular site may be restricted or prevented by steric hindrance.

The polyols used in the present invention have a value of m active hydrogen atoms in the range from 2 to 7. Preferably, the value of m is in the range from 2 to 6. More preferably, in the range from 3 to 5.

As the number of hydroxyl groups present on the polyol is equivalent to the number of m active hydrogen atoms, the preferred numbers of hydroxyl groups present will be the same as listed for the preferred numbers of m active hydrogen atoms.

The polyol residue may be homogeneous in that it comprises only one specific polyol residue and is formed from one specific polyol. In an alternative embodiment, the polyol residue starting material may be heterogeneous in that it comprises a mixture of a number of different polyols have different values of m selected from those listed above, and therefore the polyol residue formed therefrom may be heterogeneous.

The polyol may be selected from diols, triols, tetrols, pentols, hexols, heptols, or octols. Preferably, the polyol may be selected from triols, tetrols, pentols, hexols, or heptols. More preferably, the polyol may be selected from triols, tetrols, or hexols.

Suitable specific polyols may be selected from ethylene glycol, isosorbide, 1,3-propanediol, propylene glycol, trimethylolpropane, trimethylolethane, glycerol, triglycerol, erythritol, threitol, pentaerythritol, sorbitan, arabitol, xylitol, ribitol, fucitol, mannitol, sorbitol, sucrose, maltose, galactitol, iditol, inositol, volemitol, isomalt, maltitol, or lactitol.

In one particular embodiment, polyols obtainable from natural sources may be preferred. In particular, sugar alcohols may be used to form the polyol residue. In this specification the terms 'sugars' and 'sugar alcohols' refer to a group of saccharide derived polyols having from 4 to 7 hydroxyl groups. Examples of preferred sugars and sugar alcohols may include monosaccharides and disaccharides having from 4 to 7 hydroxyl groups. Residues of monosaccharide, more preferably of glucose, fructose or sorbitol, and particularly of sorbitol or sorbitan, may be preferred as polyols obtained from natural sources.

Particularly preferred polyol residues are those wherein m represents a value of 3, 4, or 6, and where said residues are $C_3$ to $C_6$ polyol residues. Most preferably, the polyol residue is formed from glycerol, sorbitol, sorbitan, or oligomers thereof.

The $C_1$ to $C_{28}$ hydrocarbyl may preferably be selected from a $C_1$ to $C_{28}$ alkyl or a $C_1$ to $C_{28}$ alkenyl.

The term 'alkyl' as used herein, unless otherwise defined, refers to saturated hydrocarbon radicals being straight chain, branched, or combinations thereof, containing from 1 to 28 carbon atoms. Preferably, the alkyls each contain from 5 to 26 carbon atoms. More preferably, 10 to 24 carbon atoms. Most preferably, 16 to 22 carbon atoms.

Examples of alkyl radicals may be independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, or branched variants thereof.

The alkyl radicals may preferably be selected from dodecyl, tridecyl, tetradecyl, pentadecyl, hexadecyl, heptadecyl, octadecyl, nonadecyl, eicosyl, or branched variants thereof.

The term 'alkenyl' as used herein, unless otherwise defined, refers to hydrocarbon radicals having at least one or a plurality, preferably no more than four, double bonds. The alkenyl radicals may be straight chain, or branched moieties, or combinations thereof.

The alkenyl radicals may each contain from 2 to 28 carbon atoms. Preferably, the alkenyls each contain from 5 to 26 carbon atoms. More preferably, 10 to 24 carbon atoms. Most preferably, 16 to 22 carbon atoms.

Examples of alkenyl radicals may be independently selected from ethyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenenyl henicosenyl, docosenyl, tricosenyl, tetracosenyl, pentacosenyl, hexacosenyl, heptacosenyl, octacosenyl, or branched variants thereof.

The alkenyl radicals may preferably be selected from dodecenyl, tridecenyl, tetradecenyl, pentadecenyl, hexadecenyl, heptadecenyl, octadecenyl, nonadecenyl, eicosenyl, or branched variants thereof.

At least one of the $R^1$ groups present in the spray drift reductant represents an alkanoyl group represented by —C(O)$R^2$ in which $R^2$ will represent a $C_8$ to $C_{28}$ hydrocarbyl. Said alkanoyl group may preferably be a residue of a fatty acid.

The $C_8$ to $C_{28}$ hydrocarbyl is preferably selected from a $C_8$ to $C_{28}$ alkyl or $C_8$ to $C_{28}$ alkenyl. More preferably, a $C_8$ to $C_{14}$ alkyl or $C_{12}$ to $C_{24}$ alkenyl. Most preferably, a $C_8$ to $C_{12}$ alkyl or $C_{16}$ to $C_{20}$ alkenyl.

Said $C_8$ to $C_{28}$ alkyl or $C_8$ to $C_{28}$ alkenyls may be selected from the alkyl radicals and alkenyl radicals as listed herein having $C_8$ to $C_{28}$ carbon atoms. Said $C_8$ to $C_{28}$ alkyl or $C_8$ to $C_{28}$ alkenyls may also be selected such that the resulting ester is in a liquid state at room temperature and pressure. The chain lengths may be selected so that the viscosity of the spray drift reductant is kept low and within desired values and the resulting is not a waxy solid.

The term 'residue of a fatty acid' as used herein refers to the moiety that is the resulting product of the fatty acid in a particular reaction scheme or subsequent formulation or chemical product, regardless of whether the moiety is actually obtained from the specified chemical species. A 'fatty acid residue' thereby refers to the moiety which results when a fatty acid participates in a particular reaction (i.e. the residue is a fatty alkanoyl group RC(O)—). The fatty acid residue is therefore 'derived' from the respective fatty acid. It is understood that this moiety can be obtained by a reaction with a species other than the specified fatty acid per se, for example, by a reaction with an unsaturated fatty acid chloride, ester, or anhydride.

The fatty acids used in the present invention are preferably selected from $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{22}$ fatty acids. Especially $C_{18}$ fatty acids may be preferred.

The fatty acids may be selected from linear or branched fatty acids. The fatty acids may be selected from saturated or unsaturated fatty acids.

Where unsaturated fatty acids are present, these may be selected from unsaturated fatty acids comprising at least one unsaturated carbon-carbon double bond. Particularly preferred are unsaturated fatty acids having in the range from 1 to 3 carbon-carbon double bonds. Most preferred are mono-unsaturated or di-unsaturated fatty acids residues. The carbon-carbon double bond(s) of the fatty chain may be present either in a cis or a trans configuration.

Preferably, the fatty acids residues used are derived from linear mono-unsaturated or di-unsaturated fatty acids. The preferred fatty acids may also comprise some tri-unsaturated fatty acids as it has been found that addition may improve cold liquid stability properties.

Iodine values are understood to represent the average amount of unsaturation of fats or oils, and is expressed in terms of the number of centigrams of iodine absorbed per gram of sample (% iodine absorbed). Where unsaturated fatty acids are present, said fatty acids may be selected such that the iodine value is greater than 70. Preferably, said iodine value is greater than 90. More preferably, said iodine value is greater than 100. Most preferably, said iodine value is greater than 110.

Suitable saturated fatty acids may be selected from caprylic acid, capric acid, lauric acid, myristic acid, palmitic acid, stearic acid, arachidic acid, behenic acid, or lignoceric acid. Preferred saturated fatty acids may be selected from caprylic acid, capric acid, lauric acid, or myristic acid.

Suitable unsaturated fatty acids may be selected from myristoleic acid, palmitoleic acid, sapienic acid, oleic acid, elaidic acid, vaccenic acid, linoleic acid, linoelaidic acid, arachidonic acid, eicosapentaenoic acid, erucic acid, or docosahexaenoic acid. Preferred unsaturated fatty acids may be selected from oleic acid, linoleic acid, linolenic acid, palmitoleic acid, or elaidic acid. Particularly preferred unsaturated fatty acids may be oleic acid, linoleic acid, and mixtures thereof.

The fatty acids may be unsaturated fatty acid mixtures obtained from natural fats and oils, e.g. canola oil, sunflower oil, soybean oil, olive oil, cotton seed oil, grape seed oil, peanut oil, rapeseed oil, safflower oil, cottonseed oil, or tall oil. Preferably canola oil, safflower oil, soybean oil, or tall oil.

In an alternative embodiment, the fatty acid used may be purified prior to use in the present invention. Purification may be undertaken to raise the levels of desired fatty acid chains and reduce the level of undesired fatty acid chains in order to modify the iodine values, titre values, or pour points.

Particularly suitable fatty esters of $C_3$ to $C_8$ polyols or oligomers thereof include glycerol, diglycerol, or sorbitan esters of oleic acid, elaidic acid, linoleic acid, or erucic acid The fatty esters of $C_3$ to $C_8$ polyols or oligomers of the present invention may be esterified at any of the m active hydrogen sites on the polyol thereby providing mono ester or poly esterified polyols. Said polyols may therefore be partially or fully esterified. Preferably, said polyols are partial esters which remain insoluble in water.

The fatty esters of $C_3$ to $C_8$ polyols or oligomers of the present invention may be esterified at between 25 to 75% of the m active hydrogen sites on the polyol. Preferably, 35 to 65% of the m active hydrogen sites. More preferably, 40 to 60% of the m active hydrogen sites. Most preferably, around 50% of the m active hydrogen sites.

The fatty esters of $C_3$ to $C_8$ polyol used in the present invention preferably comprise a mixture of mono-, di-, tri-, and optionally tetra-, esters. The concentration of monoesters is suitably at least 20%, preferably at least 25%, more preferably at least 30%, particularly at least 35%, and especially at least 40% by weight based upon the total concentration of fatty esters of $C_3$ to $C_8$ polyol. The concentration of the combination of monoesters and diesters is suitably at least 50%, preferably at least 65%, more preferably at least 75%, particularly at least 80%, and especially at least 85% by weight based upon the total concentration of fatty esters of $C_3$ to $C_8$ polyol. Correspondingly, the concentration of tri- and tetra-esters is suitably not more than 50%, preferably not more than 35%, more preferably not more than 25%, particularly not more than 20%, and especially not more than 15% by weight based upon the total concentration of fatty esters of $C_3$ to $C_8$ polyol. In particular, the preferred amounts of mono-, di-, tri-, and optionally tetra-, esters may preferably be for monomeric polyol esters.

The fatty esters of $C_3$ to $C_8$ polyol or oligomers thereof preferably have a HLB value, as calculated by Griffin's method, of less than 10, more preferably less than 8, and most preferably less than 7. The fatty esters of $C_3$ to $C_8$ polyol component suitably has a HLB value in the range from 1 to 8, preferably 2 to 6, more preferably 3 to 5.

In particular, the HLB of the spray drift reductant may be in the range 4 to 5 where the fatty esters of $C_3$ to $C_8$ polyol or oligomer thereof is based on $C_6$ sugar alcohols. In an alternative embodiment where the fatty esters of $C_3$ to $C_8$ polyol or oligomer thereof is based on $C_3$ polyols, the HLB may be less than 4.

Specific preferred examples of fatty esters of $C_3$ to $C_8$ polyol or oligomers thereof may be selected from sorbitan mono-oleate, glycerol mono-oleate, sorbitan sesquioleate, sorbitan di-oleate, sorbitan tri-oleate, glycerol ester of tall oil or diglycerol ester of tall oil, glycerol ester of canola oil or diglycerol ester of canola oil, glycerol ester of safflower oil or diglycerol ester of safflower oil, glycerol ester of soy oil or diglycerol ester of soy oil, di-glycerol oleate, tri-glycerol oleate, di-glycerol isostearate, or tri-glycerol isostearate.

The spray drift reductants may preferably be liquid at room temperature and pressure. Most preferably, the spray drift reductants are liquid and remain as liquid and free from suspended solids in the sprayable agrochemical formulation at temperatures down to 0° C. for at least 24 hours.

The spray drift reductants may also have low or no aquatic toxicity, and be acceptable for food use. Specifically, the reductants may be selected from those which avoid classification as hazardous under the Globally Harmonized System (GHS), that are acceptable for organic production as defined by the USDA National Organic Program, and/or that are acceptable for use as additives to food as defined by the US Food and Drug Administration, the UN WHO Joint Expert Committee on Food Additives (JECFA) or related EU food The spray drift reductant may preferably be non-self-emulsifiable. Said reductant may therefore need to be emulsified, and said emulsification may be achieved by mechanical action, such as homogenisation, or by addition of an emulsifier compound.

The term 'clathrate' as used herein, unless otherwise defined, refers to a chemical substance which comprises a lattice that traps or contains the relevant molecules, in this case fatty esters of a $C_3$ to $C_8$ polyol or oligomer thereof having from 2 to 5 repeat units. Said spray drift reductants, when comprised in said lattice will be understood as being in a 'clathrated' form.

Clathrates which may be used for the present invention include in particular urea clathrates or thiourea clathrates. Preferably, urea clathrates are used.

It will be understood that the spray drift reductants which are comprised in the clathrated are the fatty esters of a $C_3$ to $C_8$ polyol or oligomer thereof having from 2 to 5 repeat units as already defined herein.

In particular, when including a clathrate in the agrochemical formulation, the spray drift reductant may be selected from mono and diglycerol esters comprised within urea clathrates.

Clathrates may be preferably included in the agrochemical formulation when including nutrients, especially where the agrochemical formulation is in the form of dry, water soluble, or water dispersible solid.

The spray drift reductant of the present invention may be obtainable by esterifying a $C_3$ to $C_8$ polyol. Preferably, the fatty esters of $C_3$ to $C_8$ polyol may be obtained by esterifying a $C_3$ to $C_8$ polyol by any suitable method.

Alternatively, the respective polyglyceride (for example triglyceride) may be trans-esterified to provide a mixture of mono and poly esterified polyol. The method may be adapted to provide higher concentrations of more preferred components.

Where oligomers of $C_3$ to $C_8$ polyols are use, the oligomers may be first formed by oligomerising the respective polyol monomer units, and the oligomer may then be esterified.

The step of esterification of the polyol or polyol oligomer may be undertaken by techniques well known in the art, for example by reacting the polyol or oligomer with the required amounts of fatty acid source under acidic or basic conditions. The polyol or oligomer therefore undergoes an esterification reaction with fatty acid. Preferably, the spray drift reductant of the present invention may be obtained by directly esterifying a polyol or oligomer.

The method of forming the $C_3$ to $C_8$ polyol or oligomer esters may comprise using biologically derived fatty acids and polyols or oligomers. It can be seen that the components may be derived from biological materials, but the spray drift reductant itself is formed by a chemical synthesis. This may result in greater reproducibility and more consistent product with greater purity. Synthesising the reductants in this way allows for improved control of the process, and therefore improved control of the resultant properties such as viscosity and freezing point.

It can be seen that, depending on the particular reaction conditions, the polyol or oligomer may be partially or fully esterified. At least one of the active hydrogens m of the polyol or oligomer is esterified. Preferably, at least 1 or 2 of the active hydrogens m of the polyol or oligomer are esterified.

In a suitable embodiment of the invention, on average in the range from 1 to 2.5 of the $R^1$ groups comprise an alkanoyl group represented by $-C(O)R^2$. Preferably, on average in the range from, 1.2 to 1.8. Said average being measured across a bulk amount of the formed spray drift reductant.

The clathrate comprising a spray drift reductant may be used when preparing dry, solid agrochemical formulations, preferably when preparing a nutrient comprising formulation. The method of forming the clathrate comprising the reductant includes the steps of heating, if necessary melting, the reductant to an appropriate temperature, then adding in urea to form a mixture. Preferably the clathrate compound is added at an amount of above 40 wt. % of the mixture, more preferably around 50 wt. %. The mixture is then recrystallised by either i) pouring in to slabs and producing particles by grinding, ii) pastilating it, or iii) spraying of the clathrate to give fine granular solid.

The molecular weight (weight average) of the spray drift reductant is preferably in the range from 200 to 2200, more preferably 250 to 1900, particularly 330 to 1500, further preferably, 350 to 1270, and especially 370 to 950.

The agrochemical formulation according to the present invention may also contain components, such as surfactant materials which form part of the emulsifier system. Said surfactants may include surfactant dispersants.

Suitable surfactants include relatively hydrophilic surfactants, e.g. having a HLB value of greater than 10, preferably greater than 12. The surfactants may alternatively be relatively hydrophobic surfactants which are not fatty esters of $C_3$ to $C_8$ polyol or oligomers thereof having 2-5 repeat units, and may have HLB values of less than 10, preferably less than 8.

Relatively hydrophilic surfactants include alkoxylate surfactants with an average in the range from about 10 to about 100 alkylene oxide, particularly ethylene oxide, residues; and relatively hydrophobic surfactants include alkoxylate surfactants preferably with an average in the range from about 3 to about 10 alkylene oxide, particularly ethylene oxide, residues.

Other suitable surfactants may be selected from those which may be emulsifying, readily miscible, non-gelling, readily dilutable, and/or dispersible.

One example of suitable surfactants may include polysorbates, for example poly alkoxylated sugar alcohol esters. Suitable examples of such surfactants may include typically non-ionic polymeric ether surfactants. The most commonly used examples are polysorbates such as polysorbate 20 and polysorbate 80 (sold under the Tween brand).

In particular a surfactant comprising non-ionic alkoxylate, preferably an alkoxylated fatty alcohol, may be included.

In a one embodiment the non-ionic alkoxylate component is an alkoxylated alcohol of the general formula:

$$R^3-O-(AO)_x-H \quad (II)$$

wherein
  $R^3$ is a straight or branched chain, saturated or unsaturated, substituted or unsubstituted hydrocarbon group having from 4 to 30 carbon atoms;
  AO is an oxyalkylene group; and
  x represents an integer in the range from 1 to 30.

The oxyalkylene groups (AO) may be selected from groups of the formula $-(C_yH_{2y}O)-$ where y is an integer selected from 2, 3, or 4. Preferably, y is 2 or 3.

The oxyalkylene group AO may be selected from oxyethylene, oxypropylene, oxybutylene, or oxytetramethylene. Preferably, the oxyalkylene group is selected from oxyethylene (EO) and/or oxypropylene (PO).

Where the oxyalkylene chain is homopolymeric, homopolymers of ethylene oxide or propylene oxide are preferred. More preferably, homopolymers of ethylene oxide are particularly preferred.

Where there is more than one oxyalkylene group present (i.e. where x is 2 or more) and at least two are part of the same oxyalkylene chain, the oxyalkylene groups may be the same or may be different along said oxyalkylene chain. In this embodiment, the oxyalkylene chain may be a block or random copolymer of differing oxyalkylene groups.

Where the viscosity of the formulation needs to be lowered, block or random copolymer of differing oxyalkylene groups in the alkoxylated fatty alcohol may be particularly preferred.

The number of oxyalkylene groups in each oxyalkylene chain (i.e. the value of the each parameter x) will be in the range from 1 to 30. Preferably, in the range from 2 to 25. More preferably, in the range from 3 to 10. Further preferably, in the range from 4 to 7.

The $C_4$ to $C_{30}$ hydrocarbyl may preferably be selected from a $C_4$ to $C_{30}$ alkyl or a $C_4$ to $C_{30}$ alkenyl.

The term 'alkyl' as used herein, unless otherwise defined, refers to saturated hydrocarbon radicals being straight chain, branched, or combinations thereof, containing from 4 to 30 carbon atoms. Preferably, the alkyls each contain from 6 to 24 carbon atoms. More preferably, 8 to 22 carbon atoms. Most preferably, 10 to 20 carbon atoms.

Examples of alkyl radicals may be independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, or branched variants thereof.

The alkyl radicals may preferably be selected from dodecyl, tridecyl, tetradecyl, pentadecyl, hexadecyl, heptadecyl, octadecyl, nonadecyl, eicosyl, or branched variants thereof.

The term 'alkenyl' as used herein, unless otherwise defined, refers to hydrocarbon radicals having at least one or a plurality, preferably no more than four, double bonds. The alkenyl radicals may be straight chain, or branched moieties, or combinations thereof.

The alkenyl radicals may each contain from 4 to 30 carbon atoms. Preferably, the alkenyls each contain from 5 to 26 carbon atoms. More preferably, 10 to 24 carbon atoms. Most preferably, 16 to 22 carbon atoms.

Examples of alkenyl radicals may be independently selected from ethyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenenyl henicosenyl, docosenyl, tricosenyl, tetracosenyl, pentacosenyl, hexacosenyl, heptacosenyl, octacosenyl, or branched variants thereof.

The alkyl radicals may preferably be selected from dodecenyl, tridecenyl, tetradecenyl, pentadecenyl, hexadecenyl, heptadecenyl, octadecenyl, nonadecenyl, eicosenyl, or branched variants thereof.

More preferably, $R^3$ may be derived from, and the residue of a fatty alcohol.

Where $R^3$ is derived from a fatty alcohol, $R^3$ represents an alkoxy group (R—O—) being a residue of a fatty alcohol.

The term 'residue of a fatty alcohol' as used herein refers to the moiety that is the resulting product of the fatty alcohol in a particular reaction scheme or subsequent formulation or chemical product, regardless of whether the moiety is actually obtained from the specified chemical species. A 'fatty alcohol residue' thereby refers to the moiety which results when a fatty alcohol participates in a particular reaction (i.e. the residue is a fatty alkoxy group R—O—). The fatty alcohol residue is therefore 'derived' from the respective fatty alcohol. It is understood that this moiety can be obtained by a reaction with a species other than the specified fatty alcohol per se, for example, by a reaction with an unsaturated fatty alcohol chloride, ester, or anhydride.

The fatty alcohols may preferably be selected from $C_4$ to $C_{30}$ fatty alcohols, more preferably $C_6$ to $C_{24}$ fatty alcohols, particularly $C_{10}$ to $C_{22}$ fatty alcohols, further preferably $C_{10}$ to $C_{16}$ fatty alcohols, and especially $C_{12}$ fatty alcohols.

The fatty alcohols may be selected from linear or branched fatty alcohols. The fatty alcohols may be selected from saturated or unsaturated fatty alcohols.

Where unsaturated fatty alcohols are present, these may be selected from unsaturated fatty alcohols comprising at least one unsaturated carbon-carbon double bond. Particularly preferred are unsaturated fatty alcohols having in the range from 1 to 3 carbon-carbon double bonds. Most preferred are mono-unsaturated fatty alcohols residues. The carbon-carbon double bond of the fatty chain may be present either in a cis or a trans configuration.

Preferably, the fatty alcohols residues used are derived from linear saturated fatty alcohols.

Suitable saturated and unsaturated fatty alcohols in particular may be selected from capryl alcohol pelargonic alcohol, capric alcohol, undecyl alcohol, lauryl alcohol, tridecyl alcohol, myristyl alcohol, pentadecyl alcohol, cetyl alcohol, palmitoleyl alcohol, heptadecyl alcohol, stearyl alcohol, nonadecyl alcohol, arachidyl alcohol, heneicosyl alcohol, or behenyl alcohol, oleyl alcohol, elaidyl alcohol, linoleyl alcohol, linolenyl alcohol, or erucyl alcohol.

In particular, unsaturated and saturated $C_{10}$ to $C_{16}$ fatty alcohols may be preferred. The fatty alcohols may preferably be selected from capric alcohol, lauryl alcohol, or myristyl alcohol.

Suitable non-ionic alkoxylates having utility in the context of the present invention may be selected from lauryl alcohol (4 EO) ethoxylate, lauryl alcohol (5 EO) ethoxylate, lauryl alcohol (6 EO) ethoxylate, oleyl (3 EO) ethoxylate, oleyl (5 EO) ethoxylate, or oleyl (10 EO) ethoxylate.

The non-ionic alkoxylates may in particular be selected from those which are miscible with the spray drift reductant.

Agrochemically active compounds, in particular systemic insecticides and fungicides, or nutrients require a formulation which allows the active compounds or nutrients to be taken up by the plant/the target organisms.

The term 'agrochemical formulation' as used herein refers to compositions including an active or nutrient agrochemical, and is intended to include all forms of compositions, including concentrates and spray formulations. If not specifically stated, the agrochemical formulation of the present invention may be in the form of a concentrate, a diluted concentrate, or a sprayable formulation.

The spray drift reductant may be combined with other components in order to form an agrochemical formulation comprising at least one agrochemical active and/or nutrient.

Accordingly, agrochemical active compounds may be formulated as an emulsifiable concentrate (EC), emulsion concentrate (EW), suspension concentrate (SC), soluble liquid (SL), as an oil-based suspension concentrate (OD), and/or suspoemulsions (SE).

In an EC formulation and in an SL formulation, the active compound may be present in dissolved form, whereas in an OD, SC, or SE formulations the active compound may be present as a solid or emulsified liquid.

It is envisaged that the spray drift reductant of the present invention will particularly find use in a SC, OD, or SE formulation.

The agrochemical formulation of the present invention may be in the form of a concentrate, a diluted concentrate, or a sprayable formulation.

Agrochemical concentrates are agrochemical compositions, which may be aqueous or non-aqueous, and which are designed to be diluted with water (or a water based liquid) to form the corresponding spray formulations. Said compositions include those in liquid form (such as solutions, emulsions, or dispersions) and in solid form (especially in water dispersible solid form) such as granules or powders.

Spray formulations are aqueous agrochemical formulations including all the components which it is desired to apply to the plants or their environment. Spray formulations can be made up by simple dilution of concentrates containing desired components (other than water), or by mixing of the individual components, or a combination of diluting a concentrate and adding further individual components or mixtures of components. Typically such end use mixing is carried out in the tank from which the formulation is sprayed, or alternatively in a holding tank for filling the spray tank. Such mixing and mixtures are typically termed tank mixing and tank mixtures.

A spray drift reductant may therefore be incorporated into the formulation of the agrochemical active or nutrient compound (in-can formulation) or be added after dilution of the concentrated formulation of the spray liquor (tank-mix). To avoid dosage errors and to improve user safety during application of agrochemical products, it is advantageous to incorporate the spray drift reductants into the formulation. This also avoids the unnecessary use of additional packaging material for the tank-mix products.

According to the needs of the customer, concentrates thus formed may comprise typically up to 95 wt. % agrochemical actives or nutrients. Said concentrates may be diluted for use resulting in a dilute composition having an agrochemical active or nutrient concentration of about 0.5 wt. % to about 1 wt. %. In said dilute composition (for example, a spray formulation, where a spray application rate may be from 10 to 500 l·ha$^{-1}$) the agrochemical active or nutrient concentration may be in the range from about 0.001 wt. % to about 1 wt. % of the total formulation as sprayed.

The spray drift reductant of the formula (I) will typically be used either in an amount proportional to the amount of the active agrochemical or nutrient in the formulation, or more preferably in an amount proportional to the volume of spray solution to be applied. In agrochemical formulation concentrates, the proportion of spray drift reductant will depend on the solubility of the components in the liquid carrier. Typically, the concentration of spray drift reductant in such a concentrate will be from 1 wt. % to 99 wt. %. Preferably, from 1 wt. % to 70 wt. %. More preferably, from 3 wt. % to 50 wt. %. Further preferably, from 5 wt. % to 30 wt. %. Most preferably, from 7 wt. % to 20 wt. %.

Upon dilution to form, for example, a spray formulation, the spray drift reductant will typically be present at a concentration of from 0.01 wt. % to 2 wt. %, more usually from 0.03 wt. % to 0.5 wt. % of the spray formulation. Further preferably, from 0.12 wt. % to 0.4 wt. % of the spray formulation.

When concentrates (solid or liquid) are used as the source of active agrochemical and/or spray drift reductant, the concentrates will typically be diluted to form the spray formulations. The dilution may be with from 1 to 10,000, particularly 10 to 1,000, times the total weight of the concentrate of water to form the spray formulation.

Where the agrochemical active is present in the aqueous end use formulation as solid particles, most usually it will be present as particles mainly of active agrochemical. However, if desired, the active agrochemical can be supported on a solid carrier e.g. silica or diatomaceous earth, which can be solid support, filler or diluent material as mentioned above.

Where the dispersed phase is a non-aqueous liquid, said liquid will typically be an oil. The oil may be or include a mineral oil, including aliphatic (paraffin) mineral oils and aromatic mineral or synthetic oils, such as those sold under the trade name Solvesso; an optionally hydrogenated vegetable oil, such as an optionally hydrogenated cotton seed oil, linseed oil, mustard oil, neem oil, niger seed oil, oiticica oil, olive oil, palm oil, palm kernel oil, peanut oil, perilla oil, poppy seed oil, rape seed oil, safflower oil, sesame oil, or soybean oil; an ester oil (a synthetic ester oil), especially a $C_{16}$ ester of a $C_8$ to $C_{22}$ fatty acid, especially a $C_{12}$ to $C_{18}$ fatty acid, or a mixture of esters, such as methyl laurate, 2-ethylhexyl laurate, heptadecanoate, heptadecenoate, heptadecadienoate, stearate or oleate, and in particular methyl laurate and oleate; N-methylpyrrolidone; or an isoparaffin; or a mixture of such oils.

The spray formulations will typically have a pH within the range from moderately acidic (e.g. about 3) to moderately alkaline (e.g. about 10), and particular near neutral (e.g. about 5 to 8).

More concentrated formulations will have similar degrees of acidity/alkalinity, but as they may be largely non-aqueous, pH is not necessarily an appropriate measure of this.

The agrochemical formulation may include solvents (other than water) such as monopropylene glycol, oils which can be vegetable or mineral oils such as spray oils (oils included in spray formulations as non-surfactant adjuvants), associated with the reductant. Such solvents may be included as a solvent for the spray drift reductant and/or as a humectant, e.g. especially propylene glycol. When used such solvents will typically be included in an amount of from 5 wt. % to 500 wt. %, desirably 10 wt. % to 100 wt. %, by weight of the spray drift reductant. Such combinations can also include salts such as ammonium chloride and/or sodium benzoate, and/or urea especially as gel inhibition aids.

The agrochemical formulation may also include;
preservatives and/or anti-microbials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the composition; and/or
antifoam agents e.g. polysiloxane antifoam agents, typically in amounts of 0.005 wt. % to 1 wt. % of the composition.

Other adjuvants, particularly surfactant adjuvants, may be included in the compositions and formulations of and used in this invention. Examples include linear alcohol alkoxylates (as may be present in materials made for use in this invention derived from linear alcohols in the starting materials); alkylpolysaccharides (more properly called alkyl oligosaccharides); fatty amine ethoxylates e.g. coconut alkyl amine 2EO; sorbitan and sorbitol ethoxylate derivatives, such as those sold under the trade names Atlox and Tween by Croda Europe Limited; and derivatives of alk(en)yl succinic anhydride, in particular those described in PCT applications WO 94/00508 and WO 96/16930.

The agrochemical formulations may also include other components including:
- binders, particularly binders which are readily water soluble to give low viscosity solutions at high binder concentrations, such as polyvinylpyrrolidone; polyvinyl alcohol; carboxymethyl cellulose; gum arabic; sugars e.g. sucrose or sorbitol; starch; ethylene-vinyl acetate copolymers, sucrose and alginates,
- diluents, absorbents or carriers such as carbon black; talc; diatomaceous earth; kaolin; aluminium, calcium or magnesium stearate; sodium tripolyphosphate; sodium tetraborate; sodium sulphate; sodium, aluminium and mixed sodium-aluminium silicates; and sodium benzoate,
- disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;
- wetting agents such as alcohol ethoxylate and alcohol ethoxylate/propoxylate wetting agents;
- dispersants such as sulphonated naphthalene formaldehyde condensates and acrylic copolymers such as the comb copolymer having capped polyethylene glycol side chains on a polyacrylic backbone;
- emulsifiers such as alcohol ethoxylates, ABA block co polymers, or castor oil ethoxylates;
- antifoam agents, typically at a concentration of from 1 to 10% by weight of the granule; and
- viscosity modifiers such as commercially available water soluble or miscible gums, e.g. xanthan gums, and/or cellulosics, e.g. carboxy-methyl, ethyl or propylcellulose.

Suitable agrochemical actives for use in the formulations according to the invention are all agrochemically active compounds, preferably those which are solid at room temperature. It is envisaged that the spray drift reductant of the present invention would have broad applicability to all types of agrochemical actives.

Agrochemical actives refer to biocides which, in the context of the present invention, are plant protection agents, more particular chemical substances capable of killing different forms of living organisms used in fields such as medicine, agriculture, forestry, and mosquito control.

Also counted under the group of biocides are so-called plant growth regulators.

Biocides for use in agrochemical formulations of the present invention are typically divided into two sub-groups:
- pesticides, including fungicides, herbicides, insecticides, algicides, moluscicides, miticides and rodenticides, and
- antimicrobials, including germicides, antibiotics, antibacterials, antivirals, antifungals, antiprotozoals and antiparasites.

In particular, biocides selected from insecticides, fungicides, or herbicides may be particularly preferred.

The term 'pesticide' will be understood to refer to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical compositions according to the present invention are given.

A fungicide is a chemical control of fungi. Fungicides are chemical compounds used to prevent the spread of fungi in gardens and crops. Fungicides are also used to fight fungal infections. Fungicides can either be contact or systemic. A contact fungicide kills fungi when sprayed on its surface. A systemic fungicide has to be absorbed by the fungus before the fungus dies.

Examples for suitable fungicides, according to the present invention, encompass the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper (II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, flutrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitrostyrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

An herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat.

Suitable herbicides may be selected from the group comprising: aryloxycarboxylic acid e.g. MCPA, aryloxyphenoxypropionates e.g. clodinafop, cyclohexanedione oximes e.g. sethoxydim, hydroxybenzonitriles e.g. bromoxynil, sulphonylureas e.g. nicosulphuron, triazolopyrimidines e.g. penoxsulam, triketiones e.g. mesotriones, triazine herbicides such as metribuzin, hexaxinone, or atrazine; sulphonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxyacetic acids; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; and/or dihalobenzonitrile herbicides such as bromoxynil, or ioxynil, benzoic acid herbicides, dipyridilium herbicides such as paraquat.

Particularly preferred herbicides may be selected from 2,4-dichlorophenoxyacetic acid (2,4-D), atrazine, dicamba as benzoic acid, glyphosate, glufosinate, imazapic as imidazolinone, metolachlor as chloroacetamide, picloram, clopyralid, and triclopyr as pyridinecarboxylic acids or synthetic auxins, their respective water soluble salts and esters, and mixtures thereof.

An insecticide is a pesticide used against insects in all developmental forms, and include ovicides and larvicides used against the eggs and larvae of insects. Insecticides are used in agriculture, medicine, industry and the household.

Suitable insecticides may include those selected from: chlorinated insecticides such as, for example, Camphechlor, DDT, Hexachloro-cyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures; organophosphorous compounds such as, for example, Acephate, Azinphosmethyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture; carbamates such as, for example, Aldicarb, Carbofuran, Carbaryl, Methomyl, Methylpropyl)phenyl methylcarbamate and their mixtures; pyrethroids such as, for example, Allethrin, Bifenthrin, Deltamethrin, Permethrin, Resmethrin, Sumithrin, Tetramethrin, Tralomethrin, Transfluthrin and their mixtures; plant toxin derived compounds such as, for example, Derris (rotenone), Pyrethrum, Neem (Azadirachtin), Nicotine, Caffeine and their mixture; neonicotinoids such as imidacloprid; abamectin e.g. emamactin; oxadiazines such as indoxacarb; and/or anthranilic diamides such as rynaxypyr.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Particular preference is given to active compounds from the classes of the azole fungicides (azaconazole, bitertanol, bromuconazole, cyproconazole, diclobutrazole, difenoconazole, diniconazole, diniconazole-M, epoxiconazole, etaconazole, fenarimol, fenbuconazole, fluquinconazole, flurprimidol, flusilazole, flutriafol, furconazole, furconazole-cis, hexaconazole, imazalil, imazalil sulphate, imibenconazole, ipconazole, metconazole, myclobutanil, nuarimol, oxpoconazole, paclobutrazole, penconazole, pefurazoate, prochloraz, propiconazole, prothioconazole, pyrifenox, simeconazole, tebuconazole, tetraconazole, triadimefon, triadimenol, triflumizole, triforin, triticonazole, uniconazole, voriconazole, viniconazole), strobilurin fungicides (azoxystrobin, dimoxystrobin, fluoxastrobin, kresoxim-methyl, metominostrobin, orysastrobin, picoxystrobin, pyraclostrobin, trifloxystrobin), the SDH fungicides, the chloronicotinyl insecticides (clothianidin, dinotefuran, imidacloprid, thiamethoxam, nitenpyram, nithiazin, acetamiprid, nitenpyram, thiacloprid), the insecticidal ketoenols (spirodiclofen, spiromesifen, spirotetramate), fiproles (fiprole, ethiprole) and butenolides, and also pymetrozine, fluopicolid, N-(3',4'-dichloro-5-fluoro-1,1'-biphenyl-2-yl)-3-(difluoromethyl)-1-methyl-1H-pyrazole-4-carboxamide and N-{2-[3-chloro-5-(trifluoromethyl)-2-pyridinyl]ethyl}-2-(trifluoromethyl)benzamide. Particular preference is also given to herbicides, in particular sulphonylureas, triketones and herbicidal ketoenols, and also safeners.

In an alternative embodiment the spray drift reductant may be used in formulation comprising nutrients in addition to, or as an alternative to, pesticide actives. In such formulations the nutrient is typically in a dry form. The spray drift reductant may preferably also be in a dry form comprised in a clathrate, with the clathrate admixed with the nutrient.

Nutrients refer to chemical elements and compounds which are desired or necessary to promote or improve plant growth. Suitable nutrients generally are described as macronutrients or micronutrients. Micronutrients typically refer to trace metals or trace elements, and are often applied in lower doses. Macronutrients typically refer to those comprising nitrogen, phosphorus, and potassium, and include fertilisers such as ammonium sulphate, and water conditioning agents.

Suitable nutrients for use in the formulations according to the invention are all nutrient compounds, preferably those which are solid at room temperature. It is envisaged that the spray drift reductant of the present invention would have broad applicability to all types of nutrients. In particular, the spray drift reductants of the present invention when comprised in a clathrate may find particular use with fertilisers, more preferably fertilisers in solid anhydrous form.

Suitable micronutrients include trace elements selected from zinc, boron, chlorine, copper, iron, molybdenum, and manganese. The micronutrients may be in a soluble form or included as insoluble solids, and may be salts or chelated.

Suitable macro nutrients include fertilisers and other nitrogen, phosphorus, potassium, calcium, magnesium, sulphur containing compounds, and water conditioning agents.

Suitable fertilisers include inorganic fertilisers that provide nutrients such as nitrogen, phosphorus, potassium or sulphur. Examples of such fertilisers include:

for nitrogen as the nutrient: nitrates and or ammonium salts such as ammonium nitrate, including in combination with urea e.g. as uran type materials, calcium ammonium nitrate, ammonium sulphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride;

for potassium as the nutrient: potassium chloride, sulphate e.g. as mixed sulphate with magnesium, phosphates, particularly potassium dihydrogen phosphate and potassium polyphosphate and less commonly potassium nitrate;

for phosphorus as the nutrient: acidic forms of phosphorus such as phosphoric, pyrophosphoric or polyphosphoric acids, but more usually salt forms such as ammonium phosphates, particularly mono-ammonium phosphate, di-ammonium phosphate, and ammonium polyphosphate, potassium phosphates, particularly potassium dihydrogen phosphate and potassium polyphosphate;

for sulphur as the nutrient: ammonium sulphate and potassium sulphate, e.g. the mixed sulphate with magnesium.

Fertilisers may be included in diluted formulations at relatively low concentrations or as more concentrated solutions, which at very high levels may include solid fertiliser as well as solution.

It is envisaged that inclusion of the nutrient would be dependent upon the specific nutrient, and that micronutrients would typically be included at lower concentrations whilst macronutrients would typically be included at higher concentrations.

When present, the proportion of nutrient in the total concentrate formulation is typically from 5 wt. % to 40 wt. %, more usually, 10 wt. % to 35 wt. %, particularly 15 wt. % to 30, % by weight based on the concentrate.

The invention further includes a method of treating or providing nutrients to plants using spray formulations including at least one dispersed phase agrochemical and a spray drift reductant of the first aspect. The agrochemical may be one or more phytoactives, for example growth regulators and/or herbicides, and/or pesticides, for example insecticides, fungicides or acaricides, or may be a nutrient.

Accordingly the invention further includes methods of use including:

a method of killing or inhibiting vegetation by applying to the vegetation, or the immediate environment of the vegetation e.g. the soil around the vegetation, a spray formulation including at least one dispersed phase agrochemical and a spray drift reductant of the first aspect;

a method of killing or inhibiting pests of plants by applying to the plants or the immediate environment of the plants e.g. the soil around the plants, a spray formulations including at least one dispersed phase agrochemical which is one or more pesticides, for example insecticides, fungicides or acaricides, and a spray drift reductant of the first aspect; and a method of providing nutrients to vegetation by applying to the vegetation, or the immediate environment of the vegetation e.g. the soil around the vegetation, a spray formulation including at least one nutrient and a spray drift reductant of the first aspect.

Spray drift reductants refer to materials that reduce the amount of undesired small spray droplets (driftable fines) and/or the amount of undesired large droplets, both in a commercially significant and desirable manner. It is understood that the modification of spray drift characteristics is achieved through the modification of the size and size distribution of droplets in the spray.

Spray applied formulations typically exhibit decreasing tendency to drift when a decreased amount of small size spray droplets are formed, that is spray droplets having a droplet size below typically 150 μm. This amount of small driftable droplets may be expressed as a volume percentage of the droplet volume of the total spray applied. There is a desire to reduce the amount of spray drift when compared to formulations either comprising alternative non-ionic surfactants or no spray drift reductant. Spray drift of pesticides can have undesirable consequences which include unintended contact of phytotoxic pesticides with non-pest pest plants causing damage to these non-pest plants, such as crops or ornamental plants.

In addition, use of the spray drift reductants of the present invention results in no or few extremely large droplets being created which might otherwise be expected when using polymer surfactants in agrochemical formulations. Large undesired droplets would typically be those having a droplet size greater than 500 micrometers The present invention will be understood to improve spray droplet characteristics with none or little degradation of spray pattern.

It will be understood that all values of particle and droplet size stated herein are with reference to the AIXR11004 spray nozzle with glyphosate and ammonium sulphate based formulations, where the spray angle is 110° and the flow rate is 0.4 gallons per minute. Values for spray drift reduction are with reference to spray formulations comprising 0.25 wt. % of the reductant. Fluid pressure for spray testing is stated at 40 psi unless stated otherwise.

Droplet size and spray measurement values may be readily determined by laser light scattering, image analysis, or phase doppler laser measurement. Droplet size measurements as used in the present application are with reference to measurement by laser light scattering using a Sympatec Helos Vario KF laser sizing system. The spray plume was directed down and traversed across the instrument laser beam; data was averaged over the spray plume.

Preferably the spray drift reductant decreases the volume of driftable fine droplets (fines). In particular, driftable fine droplets are those which are of size less than 150 μm, where this is understood by ASTM 1519 to represent the droplet size below which the droplets are driftable.

The reduction in spray drift will be therefore understood as a reduction in the volume percentage of droplets having a droplet size of less than 150 μm compared to an analogous agrochemical formulation which does not comprise the spray drift reductant of the present invention.

The spray drift reductant of the present invention may provide a percentage reduction of droplets having a size of less than 150 μm of at least 10% at a spray pressure of 30 psi. More preferably, at least 20%. Further preferably, at least 30%. Most preferably, at least 40%.

The spray drift reductant of the present invention may provide a percentage reduction of droplets having a size of less than 150 μm of at least 10% at a spray pressure of 40 psi. More preferably, at least 20%. Further preferably, at least 30%. Most preferably, at least 40%.

The spray drift reductant of the present invention may provide a percentage reduction of droplets having a size of less than 150 μm of at least 10% at a spray pressure of 60 psi. More preferably, at least 20%. Further preferably, at least 30%. Most preferably, at least 40%.

Further reduction of particularly small droplets, those having a size of less than 105 μm is provided by the present invention.

The spray drift reductant of the present invention may provide a percentage reduction of droplets having a size of less than 105 μm of at least 10% at a spray pressure of 30 psi. More preferably, at least 20%. Further preferably, at least 30%. Most preferably, at least 40%. The spray drift reductant of the present invention may provide a percentage reduction of droplets having a size of less than 105 μm of at least 10% at a spray pressure of 40 psi. More preferably, at least 20%. Further preferably, at least 30%. Most preferably, at least 40%.

The spray drift reductant of the present invention may provide a percentage reduction of droplets having a size of less than 105 μm of at least 10% at a spray pressure of 60 psi. More preferably, at least 20%. Further preferably, at least 30%. Most preferably, at least 40%.

In the form of a distribution of particle sizes, the spray droplet would have a median volume particle/droplet diameter value. It will be understood that the median volume particle diameter refers to the equivalent spherical diameter corresponding to the point on the distribution which divides the population exactly into two equal halves. It is the point which corresponds to 50% of the volume of all the particles, read on the cumulative distribution curve relating volume percentage to the diameter of the particles i.e. 50% of the distribution is above this value and 50% is below. This value is referred to as the 'D(v,0.5)' value and is determined as described herein.

Preferably the spray drift reductant increases the D(v,0.5) value. The increase in the D(v,0.5) of the spray will be therefore understood as an increase in the spray droplet median volume particle/droplet diameter value compared to an analogous agrochemical formulation which does not comprise the spray drift reductant of the present invention.

The spray drift reductant of the present invention may provide a percentage increase of the D(v,0.5) value of at least 2% at a spray pressure of 40 psi. More preferably, at least 5%. Most preferably, at least 10%.

The addition of spray drift reductants of the present invention also provide for fewer undesired large droplets, and specifically fewer large droplets in comparison to use of polymer based spray drift reductants. Large undesired droplets will be understood to have a size of greater than 500 microns.

The spray drift reductant of the present invention may provide a percentage reduction of droplets having a size of greater than 500 μm of at least 5% at a spray pressure of 30 psi. More preferably, at least 10%.

The spray drift reductant of the present invention may provide a percentage reduction of droplets having a size of greater than 500 μm of at least 5% at a spray pressure of 40 psi. More preferably, at least 10%.

The spray drift reductant of the present invention may provide a percentage reduction of droplets having a size of greater than 500 μm of at least 5% at a spray pressure of 60 psi. More preferably, at least 10%.

The spray drift reductant of the present invention, by reducing the amount of undesired small and large droplets, may change the droplet size distribution of a sprayed formulation.

The width of the droplet size distribution may be defined as the 'span' which is a measure of the width of the distribution based on the 10%, 50% and 90% quantile. Span (measured in μm) may be defined as follows:

$$\text{Span} = D(v, 0.9) - D(v, 0.1)$$

and relative span (unitless) may be defined as follows:

$$\text{Span} = \frac{D(v, 0.9) - D(v, 0.1)}{D(v, 0.5)}$$

The volume median diameter D(v,0.5) is the as defined herein. 'D(v,0.9)' and 'D(v,0.1)' values are the equivalent spherical diameter corresponding to 90% or 10% respectively of the volume of all the particles, read on the cumulative distribution curve relating volume percentage to the diameter of the particles, i.e. they are the points where 10% or 90% of the distribution is above this value and 90% or 10% are below the value respectively.

The relative span value represents the width of the particle size distribution of the spray droplets, and therefore how defined the distribution is around the median particle size value. It has been found that using the spray drift reductant of the present invention spray droplet size distribution is more narrowly defined around the desired range.

The spray drift reductant of the present invention may provide for a narrower relative span in comparison to a sprayed agrochemical formulation not comprising reductant. The percentage reduction in relative span is at least 4% at a spray pressure of 30 psi. More preferably, at least 8%. Further preferably, at least 10%. Most preferably, at least 12%.

The percentage reduction in relative span is at least 4% at a spray pressure of 40 psi. More preferably, at least 8%. Further preferably, at least 10%. Most preferably, at least 12%.

The percentage reduction in relative span is at least 4% at a spray pressure of 60 psi. More preferably, at least 8%. Further preferably, at least 10%. Most preferably, at least 12%.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

Compounds as used in the following examples are identified as follows:

A1—adjuvant combination of first adjuvant (mixture of mono and di oleate esters of diglyceride) at 30 wt. %, and co-adjuvant (lauryl alcohol (4 EO) ethoxylate) at 70 wt. %.

A2—adjuvant combination of first adjuvant (mixture of mono and di oleate esters of diglyceride) at 50 wt. %, and co-adjuvant (lauryl alcohol (4 EO) ethoxylate) at 50 wt. %.

A3—adjuvant combination of first adjuvant (mixture of mono and di oleate esters of diglyceride) at 70 wt. %, and co-adjuvant (lauryl alcohol (4 EO) ethoxylate) at 30 wt. %.

C1—polyoxyethylene (20) sorbitan monolaurate (polysorbate 20) surfactant comparative example.

C2—comparison non-ionic surfactant adjuvant nonoxynol-9.

C3—control solution, no adjuvant added.

The following test method was used to determine performance of the adjuvant compositions Spray parameters—Base solutions were prepared of 1 wt. % AMS (0.85 lbs/10 gal) and 1 wt. % glyphosate (Roundup PowerMax, 22 oz/10 gal) in tap water. Spray measurements were made using a Sympatec Helos Vario KF laser sizing system. The spray plume was directed down and traversed across the instrument laser beam, and data was averaged over the spray plume. Measurements were made at pressures of 30 psi and 60 psi, using four TeeJet nozzles: XR11004 (flat fan extended range), AI11004 (air induction), TT11004 (Turbo flat fan), and AIXR11004 (air induction extended range).

Base solutions of 1 wt. % AMS (0.85 lbs/10 gal) and 1% glyphosate (Roundup PowerMax, 22 oz/10 gal) in tap water were made up, and the adjuvants noted were added. The following sprayable adjuvant formulations were formed for further evaluation.

TABLE 1

Formulations

| Example no. | Adjuvant | Amount Added to Base Solution (% v/v) |
|---|---|---|
| 1 | A1 | 0.125 |
| 2 | A2 | 0.125 |
| 3 | A3 | 0.125 |
| 4 | A1 | 0.250 |
| 5 | A2 | 0.250 |
| 6 | A3 | 0.250 |
| 7 | A1 | 0.500 |
| 8 | A2 | 0.500 |
| 9 | A3 | 0.500 |
| 10 | C2 | 0.250 |
| 11 | C1 | 0.250 |
| 12 | C3 | N/A |

Spray Drift Results

The formulations of Examples 1 to 17 were spray tested using a variety of nozzles. Spray characterisation tests were performed using a) CR11004 nozzle, AIXR11004 nozzle, and ULD11004 nozzle, and results are shown in Tables 2, 3, and 4 respectively.

TABLE 2

Spray using a XR11004 nozzle

| Example | D(v,0.1) | D(v,0.5) | D(v,0.9) | Particles <105 μm (%) | Relative Span | Change in particles <105 μm (%)[†] |
|---|---|---|---|---|---|---|
| 1 | 116 | 246 | 416 | 7.5 | 1.21 | −24.4 |
| 2 | 126 | 253 | 421 | 5.43 | 1.17 | −45.3 |
| 3 | 134 | 261 | 423 | 4.48 | 1.11 | −54.8 |
| 4 | 139 | 266 | 430 | 3.86 | 1.1 | −61.1 |
| 5 | 139 | 266 | 420 | 3.91 | 1.06 | −60.6 |
| 6 | 141 | 267 | 421 | 3.76 | 1.05 | −62.1 |
| 7 | 136 | 258 | 411 | 4.15 | 1.07 | −58.2 |
| 8 | 137 | 261 | 415 | 3.98 | 1.06 | −59.9 |
| 9 | 139 | 263 | 413 | 3.77 | 1.04 | −62.0 |
| 10 | 109 | 238 | 413 | 9.02 | 1.28 | −9.1 |
| 11 | 91 | 219 | 406 | 13.7 | 1.44 | 38.4 |
| 12 | 105 | 244 | 458 | 9.92 | 1.44 | 0.0 |

[†]relative to control example 12 with no adjuvant

TABLE 3

Spray using a AIXR11004 nozzle

| Example | D(v,0.1) | D(v,0.5) | D(v,0.9) | Particles <105 μm (%) | Relative Span | Change in particles <105 μm (%)† |
|---|---|---|---|---|---|---|
| 1 | 204 | 427 | 685 | 1.27 | 1.13 | −18.6 |
| 2 | 223 | 447 | 703 | 0.7 | 1.07 | −55.1 |
| 3 | 234 | 454 | 702 | 0.54 | 1.03 | −65.4 |
| 4 | 235 | 455 | 688 | 0.55 | 1 | −64.7 |
| 5 | 225 | 438 | 679 | 0.59 | 1.04 | −62.2 |
| 6 | 231 | 444 | 680 | 0.55 | 1.01 | −64.7 |
| 7 | 228 | 437 | 687 | 0.54 | 1.05 | −65.4 |
| 8 | 231 | 439 | 679 | 0.55 | 1.02 | −64.7 |
| 9 | 230 | 437 | 684 | 0.55 | 1.04 | −64.7 |
| 10 | 206 | 429 | 686 | 1.19 | 1.12 | −23.7 |
| 11 | 178 | 395 | 664 | 2.46 | 1.23 | 57.7 |
| 12 | 202 | 433 | 708 | 1.56 | 1.17 | 0.0 |

†relative to control example 12 with no adjuvant

TABLE 4

Spray using a ULD11004 nozzle

| Example | D(v,0.1) | D(v,0.5) | D(v,0.9) | Particles <105 μm (%) | Relative Span | Change in particles <105 μm (%)† |
|---|---|---|---|---|---|---|
| 1 | 325 | 627 | 915 | 0.09 | 0.94 | −25.0 |
| 2 | 343 | 653 | 973 | 0.09 | 0.97 | −25.0 |
| 3 | 347 | 656 | 983 | 0.08 | 0.97 | −33.3 |
| 4 | 349 | 663 | 983 | 0.09 | 0.96 | −25.0 |
| 5 | 332 | 637 | 963 | 0.1 | 0.99 | −16.7 |
| 6 | 332 | 635 | 969 | 0.1 | 1 | −16.7 |
| 7 | 338 | 656 | 1095 | 0.01 | 1.15 | −91.7 |
| 8 | 331 | 633 | 971 | 0.11 | 1.01 | −8.3 |
| 9 | 327 | 658 | 978 | 0.11 | 1.04 | −8.3 |
| 10 | 340 | 658 | 1002 | 0.1 | 1.01 | −16.7 |
| 11 | 300 | 584 | 873 | 0.29 | 0.98 | 141.7 |
| 12 | 338 | 656 | 995 | 0.12 | 1 | 0.0 |

†relative to control example 12 with no adjuvant

The drift reduction potential of A1-A3 was compared to polysorbate 20. The above results show that the reductants of the present invention provided drift reduction compared to the control and polysorbate formulations. Additionally, this spray drift reduction was provided at low concentrations of between 0.125% and 0.5% (v/v), and across a variety of nozzles.

The performance of the adjuvants of the present invention (A1-A3) which was found to provide for significant reductions in small droplets, and therefore reductions in spray drift, using the nozzles selected. Additionally, good spray drift reduction was observed even when using Ultra Low Drift nozzle ULD11004 Nozzle. In contrast, a commonly available adjuvant polysorbate 20 was actually detrimental to spray drift, and increased the production of fine droplets under specific spray conditions.

It is to be understood that the invention is not to be limited to the details of the above embodiments, which are described by way of example only. Many variations are possible.

The invention claimed is:

1. A sprayable agrochemical formulation comprising:
   i) at least one spray drift reductant comprising a mixture of mono- and di-oleate esters of diglyceride, where 35 to 65% of the active hydrogen sites of the diglyceride are esterified and where the concentration of monoesters is at least 35% by weight based on the total concentration of esters;
   ii) at least one agrochemical active selected from the group consisting of fungicides, herbicides, insecticides, algicides, moluscicides, rodenticides, germicides, antibiotics, antibacterials, antivirals, antifungals, antiprotozoals, and antiparasites;
   iii) a urea or thiourea clathrate compound, where the clathrate compound contains the spray drift reductant and is present in an amount of at least 40 wt % based on the total weight of the spray drift reductant and the clathrate; and
   iv) at least one non-ionic alkoxylate comprising lauryl alcohol (4 EO) ethoxylate;
   wherein the at least one spray drift reductant reduces spray drift by at least 10% when compared to a formulation not comprising the spray drift reductant, and wherein the clathrate compound is admixed with a water-soluble or water-dispersible macronutrient and/or micronutrient that is in solid form at room temperature.

2. The formulation according to claim 1, wherein the spray drift reductant provides a percentage reduction of spray droplets having a size of less than 150 μm of at least 10% at a spray pressure of 40 psi when compared to a formulation not comprising the spray drift reductant.

3. The formulation according to claim 1, wherein the spray drift reductant provides a percentage reduction of spray droplets having a size of less than 150 μm of at least 20% at a spray pressure of 40 psi when compared to a formulation not comprising the spray drift reductant.

4. The formulation according to claim 1, wherein the spray drift reductant provides a percentage reduction of spray droplets having a size of less than 150 μm of at least 30% at a spray pressure of 40 psi when compared to a formulation not comprising the spray drift reductant.

5. The formulation according to claim 1, wherein the formulation is a suspension concentrate (SC), an oil-based suspension concentrate (OD), or a suspoemulsion (SE).

6. The formulation according to claim 1, wherein the agrochemical active is selected from the group consisting of insecticides, fungicides and herbicides.

7. The formulation according to claim 1, wherein the at least one spray drift reductant is present at a concentration of from 0.01 wt % to 2 wt %.

8. The formulation according to claim 1, wherein the clathrate compound is a urea clathrate compound.

9. The formulation according to claim 1, wherein the clathrate compound is a thiourea clathrate compound.

10. The formulation according to claim 1, wherein the at least one spray drift reductant provides a percentage increase in the D(v,0.5) value of spray droplets of at least 5% at a spray pressure of 40 psi when compared to a formulation not comprising the spray drift reductant.

11. The formulation according to claim 1, wherein the at least one spray drift reductant provides a percentage increase in the D(v,0.5) value of spray droplets of at least 10% at a spray pressure of 40 psi when compared to a formulation not comprising the spray drift reductant.

12. The formulation according to claim 1, wherein a mixture comprising the spray drift reductant and the clathrate compound are in the form of particles, pastilles, or a granulated solid.

13. The formulation according to claim 1, wherein the formulation is in the form of a dry, water soluble or water dispersible solid.

14. A method of reducing spray drift in an agrochemical formulation, the method comprising applying the agrochemical formulation according to claim 1 to vegetation.

* * * * *

UNITED STATES PATENT AND TRADEMARK OFFICE
CERTIFICATE OF CORRECTION

| | | |
|---|---|---|
| PATENT NO. | : 12,161,112 B2 | Page 1 of 1 |
| APPLICATION NO. | : 17/152094 | |
| DATED | : December 10, 2024 | |
| INVENTOR(S) | : Gregory James Lindner and Kevin Wade Penfield | |

It is certified that error appears in the above-identified patent and that said Letters Patent is hereby corrected as shown below:

In the Claims

Column 26, Line 3 of Claim 1: replace "moluscicides" with -- molluscicdes --

Signed and Sealed this
Eleventh Day of March, 2025

Coke Morgan Stewart
*Acting Director of the United States Patent and Trademark Office*